United States Patent Office 3,449,413
Patented June 10, 1969

3,449,413
PROCESS FOR THE MANUFACTURE OF ALKALI SALTS OF CARBOXYLIC ACIDS
Heinz Hartel, Oberlar, and Gerhard Bier, Troisdorf, Germany, assignors to Dynamit Nobel Aktiengesellschaft, Troisdorf, Bezirk Cologne, Germany, a corporation of Germany
No Drawing. Filed Apr. 9, 1965, Ser. No. 447,611
Claims priority, application Germany, Apr. 10, 1964, D 44,125
Int. Cl. C07c 51/26
U.S. Cl. 260—523
10 Claims

ABSTRACT OF THE DISCLOSURE

A process is disclosed for the oxidation of primary alcohols comprising reacting such alcohol in an alkaline aqueous medium with a mixture of a copper (II) oxide or hydroxide and a noble metal or its oxide or hydroxide.

---

The present invention relates to a process for the manufacture of alkali salts of carboxylic acids. More particularly, the present invention relates to a process for the manufacture of alkali salts of carboxylic acids by oxidation of the corresponding primary alcohols.

It is known to oxidize primary alcohols with air, oxygen or oxygen-producing substances, such as chromic acid, nitric acid, peracids, hydrogen peroxide, permanganates or chlorates to produce the corresponding aldehydes or carboxylic acids.

If unsaturated primary alcohols are involved, however, the secondary reactions usually take place to a relatively great extent. In part, this is to be attributed to the fact that the oxidizing agent also attacks the double bond and results in an extensive decomposition of the molecule, producing, for example, formaldehyde, glyoxal, formic acid or oxalic acid. Further, the low yields of the corresponding carboxylic acids generally obtained are due to the fact that the carboxylic acids and intermediately formed aldehydes, such as acrolein, are very reactive compounds, which themselves are subject to addition reactions and especially to polymerization. This explains the occurrence of glycerine, pentoses and polymers in the oxidation products of allyl alcohol.

In further known processes, acrylic acid is obtained, for instance, among other compounds, when a mixture of allyl alcohol vapor and air is passed over heated platinum, or when allyl alcohol is subjected to electrolysis under pressure at about 120° C. at a lead anode in a chromic acid solution containing hydrogen sulfide. These latter processes have the considerable disadvantage that the reaction must be conducted at high temperatures, which makes it extremely difficult to completely prevent polymerization from occurring in at least one of the phases of such process.

It is an object of the present invention to remedy the aforementioned defects of the prior art and the numerous addition defects which directly or indirectly result therefrom.

A further object is to oxidize primary alcohols by a process which is efficient and economical.

A still further object is to devise a process for producing oxidation products of primary alcohols which can be carried out continuously.

Additional objects will become apparent from a consideration of the following description and claims.

In accordance with the invention it has now been found that the oxidation of the alcohols can be effected by acting on the alcohols in an alkaline aqueous medium with a mixture of copper (II) oxide or copper (II) hydroxide and a noble metal and/or its oxide or hydroxide.

The copper (II) hydroxide may be produced by the precipitation of a chlorine-free water-soluble copper (II) compound, such as copper (II) nitrate, copper (II) sulfate, copper (II) acetate, and the like.

The complete or partial regeneration of the oxidant used up in the reaction can be carried out during the oxidation of the alcohols in the same reaction vessel or separately in an alkaline aqueous medium by treatment with oxygen or gases containing oxygen at temperatures up to about 100° C.

The composition of the oxidant can vary widely. It is advantageous to use the copper (II) oxide or copper (II) hydroxide in the presence of about 1 to about 10 mol percent of the noble metal and/or its oxide or hydroxide, but other proportions can also be satisfactorily employed.

It is advantageous to select the concentration of the remaining components so that, following completion of the alcohol oxidation, the concentration of alkali salts of the carboxylic acids formed and present in the solutions will be as high as possible.

Suitable primary alcohols to be reacted according to the present invention are the known saturated and unsaturated aliphatic alcohols. Examples of such saturated and unsaturated alcohols include n-hexyl alcohol, n-heptyl alcohol, n-octyl alcohol, n-nonyl alcohol, n-decyl alcohol, n-undecyl alcohol, n-dodecyl alcohol, n-tridecyl alcohol, n-hexadecyl alcohol, and the like, respectively allyl alcohol, methallyl alcohol. Aryl-substituted saturated and unsaturated primary alcohols, e.g., benzyl alcohol, cinnamic alcohol, and the like. Heterocyclic primary alcohols can be used as well, for instance furfuryl alcohol, tetrahydrofurfuryl alcohol, and the like.

Highly volatile alcohols can also be reacted in this manner under elevated pressure, but such a procedure is unnecessary even in the case of the simplest unsaturated primary alcohol.

The reaction may be carried out with the water-soluble alcohols being used per se or in the form of their dilute aqueous solutions. The water-insoluble alcohols or those of only limited solubility are made suitable for use in the oxidation reaction by means of an inert solvent, that means, inert against the alkaline and the oxidative agents, such as, for instance, dioxane, benzene, cyclohexanone.

A particular advantage of the procedure in accordance with the invention is that the reaction is easily completed at temperatures from about room to 100° C., and, further, due to the presence of the copper compounds which simultaneously possess inhibiting properties, no polymerization of the reactants takes place. The noble metals and/or their oxides or hydroxides which can be used in accordance with the invention include silver, gold, mercury, platinum, ruthenium, rhodium, palladium, osmium, or iridium.

The following examples are given in order to more clearly disclose the nature of the present invention. It should be understood, however, that the examples are not intended to be a limitation on the scope of the invention.

Example 1

40 g. copper (II) oxide and 13 g. silver oxide, both of which had been freshly precipitated, were placed in 200 cc. of normal caustic soda solution. Within about 1 minute, 6.55 cc. allyl alcohol were added, and the mixture was heated for another hour at about 55–60° C. to complete the reaction. Thereafter, the solids were removed and the acrylic acid sodium content of the filtrate as determined by titration amounted to 32.5% of theory.

When 12 g. metallic silver powder were used in place of the above-mentioned 13 g. silver oxide, an acrylic acid sodium yield of 31.9% of theory was obtained.

Example 2

Concentrated aqueous solutions of 121 g. $Cu(NO_3)_2$, $3H_2O$, 13.4 g. $AgNO_3$ and 5.8 allyl alcohol were added drop by dorp simultaneously and with agitation to 250 cc. of an approximately 5 N solution of NaOH. Thereafter the procedure described in Example 1 was followed. The acrylic acid sodium yield determined by titration amounted to 40.0% of theory.

Example 3

134 g. cinnamic alcohol, 200 cc. dioxane, 400 cc. 10% caustic soda solution and a freshly precipitated mixture of 318 g. copper (II) oxide and 9.5 g. silver oxide were refluxed together for 3 hours at ebullition, with agitation. Thereafter the solid substance was filtered out and the content of cinnamic acid sodium in the solution determined and found to be 55.1% of theory.

Example 4

108 g. (100.28 ml.) of benzyl alcohol in admixture to 100 ml. n-NaOH solution were heated under reflux and simultaneous introduction of $O_2$ in the presence of 3.2 g. of dry CuO and 50 mg. PdO (molar ratio 99:1; 10% of the theoretically requested quantity), thereafter the product was drawn off from the solid. The yield was determined by titration and amounted to 2.4% of the theoretical value.

Example 5

The procedure according to Example 4 was repeated with the difference, that instead of dry CuO an equal amount of precipitated CuO ($Cu(OH)_2$) was used. After 30 minutes the oxidation yield amounted to 32% of theory.

Example 6

0.1 mol n-octyl alcohol in 100 ml. n-KOH solution were heated to about 90° C. under simultaneous introduction of air in the presence of 3.2 g. of dry CuO and 93 mg. $PtO_2$ (99:1; 10% of the theoretically required quantity). The reaction began slowly.

Example 7

Procedure according to Example 6 with the difference that instead of 3.2 g. CuO an equal amount of freshly precipitated copper (II) hydroxide was used. The copper (II) hydroxide was prepared by precipitation of copper (II)-sulphate with KOH, 930 mg. platin (IV)-oxide and 500 ml. of 0.2 n-KOH were added. Air was introduced into a solution containing 0.1 mol of the above mentioned alcohol. The oxidation yield determined by titration amounted after 30 min. to 31.6% of theory.

Example 8

Example 7 was repeated using n-hexadecylalcohol instead of n-octyl alcohol, the yield, determined by titration amounted to 39.2%.

Example 9

10.2 g. (9.73 ml.) tetrahydrofurfuryl-alcohol in 100 ml. n-NaOH solution were heated to about 95° C. under simultaneous introduction of $O_2$ for 2 hours in the presence of 3.2 g. of dry CuO, 177 mg. of $Ir_2O_3$ hydrate, the solid was filtered off, and the oxidation yield was determined to 5.6% of theory.

Example 10

Procedure according to Example 9 was repeated with the difference that instead of CuO freshly precipitated copper hydroxide (from copper-II-acetate) was inserted. The oxidation yield amounted to 37.8% of theory after 20 minutes.

We claim:
1. A process for preparing alkali salts of carboxylic acids which comprises reacting in an alkaline aqueous medium a primary alcohol with a Cu(II) oxide or hydroxide in the presence of at least one member selected from the group consisting of metallic silver, mercury, gold, platinum, cadmium, iridium, ruthenium, rhodium, palladium, and the oxides and hydroxides thereof, and recovering the corresponding carboxylic acid thereby produced in the form of its salt corresponding to the alkali used for making said medium alkaline.

2. Process according to claim 1 wherein said Cu(II) compound is CuO.

3. Process according to claim 1 wherein said reaction is effected in the presence of about 1 to about 10 mol percent of said second-mentioned metal group member referred to the total of said copper compound and said metal group member.

4. Process according to claim 1 wherein said alcohol is utilized in the form of its solution in an inert solvent.

5. Process according to claim 4 wherein said solvent is dioxane.

6. Process according to claim 1 wherein said reaction is effected at a temperature of from 0–100° C.

7. Process according to claim 1 which comprises introducing a member selected from the group consisting of oxygen and gases containing oxygen into said reaction medium during said oxidation reaction whereby the metal compounds used up in said reaction are regenerated to a higher oxidation stage.

8. A process for preparing acrylic acid sodium salt which comprises reacting in an alkaline aqueous medium allyl alcohol with Cu(II)O in the presence of a member selected from the group consisting of metallic silver and silver oxide, said medium having been made alkaline with sodium hydroxide, and recovering the acrylic acid sodium salt thereby produced.

9. A process for preparing cinnamic acid sodium salt which comprises reacting in an alkaline aqueous medium cinnamic alcohol with Cu(II)O and $Ag_2O$, said medium having been made alkaline with sodium hydroxide, and recovering the cinnamic acid sodium salt thereby produced.

10. A process for oxidizing alcohols which comprises reacting in an alkaline aqueous medium a primary alcohol with a Cu(II) oxide or hydroxide in the presence of at least one member selected from the group consisting of metallic silver, mercury, gold, platinum, osmium, iridium, ruthenium, rhodium, palladium, and the oxides and hydroxides thereof, separately recovering the corresponding carboxylic acid thereby produced in the form of its salt corresponding to the alkali used for making said medium alkaline from the reaction mixture, subjecting the reaction mixture following separation of said carboxylic acid salt therefrom to treatment with a gas selected from the group consisting of oxygen and gases containing oxygen, whereby the metal compounds used up in said reaction are regenerated to a higher oxidation stage.

References Cited

UNITED STATES PATENTS

| | | | |
|---|---|---|---|
| 2,407,066 | 6/1942 | Dunlop | 260—347.3 |
| 1,694,122 | 11/1926 | Jaeger | 260—524 |

FOREIGN PATENTS

| | | |
|---|---|---|
| 287,064 | 5/1929 | Great Britain. |

OTHER REFERENCES

Dunlop, The Furans, 1953, p. 488 (Dunlop II).

LORRAINE A. WEINBERGER, *Primary Examiner.*

D. STENZEL, *Assistant Examiner.*

U.S. Cl. X.R.

260—347.3, 413, 531, 603